United States Patent
Harvey et al.

(10) Patent No.: US 9,460,010 B1
(45) Date of Patent: Oct. 4, 2016

(54) METHOD, DATA STORAGE SYSTEM AND COMPUTER PROGRAM PRODUCT FOR MANAGING COPY ON FIRST WRITE DATA FOR SNAPSHOT PURPOSES

(71) Applicant: EMC Corporation, Hopkinton, MA (US)

(72) Inventors: David W. Harvey, Newton Center, MA (US); Thomas M. Rivera, Watertown, MA (US); Karl M. Owen, Chapel Hill, NC (US)

(73) Assignee: EMC Corporation, Hopkinton, MA (US)

( * ) Notice: Subject to any disclaimer, the term of this patent is extended or adjusted under 35 U.S.C. 154(b) by 159 days.

(21) Appl. No.: 13/827,118

(22) Filed: Mar. 14, 2013

(51) Int. Cl.
*G06F 12/08* (2016.01)
(52) U.S. Cl.
CPC .................. *G06F 12/0802* (2013.01)
(58) Field of Classification Search
CPC ............. G06F 17/30088; G06F 2201/84; G06F 12/0802; G06F 11/1446
See application file for complete search history.

(56) References Cited

U.S. PATENT DOCUMENTS

| | | | | |
|---|---|---|---|---|
| 7,155,586 B1 * | 12/2006 | Wagner et al. | ............... | 711/162 |
| 7,617,372 B1 * | 11/2009 | Bjornsson et al. | ........... | 711/167 |
| 7,870,356 B1 * | 1/2011 | Veeraswamy et al. | ....... | 711/162 |
| 7,975,115 B2 * | 7/2011 | Wayda et al. | ................. | 711/162 |
| 8,874,524 B1 * | 10/2014 | Zhao et al. | .................... | 707/657 |
| 2003/0197963 A1 * | 10/2003 | Wagner et al. | ................. | 360/15 |
| 2006/0143412 A1 * | 6/2006 | Armangau | .................... | 711/162 |
| 2012/0030415 A1 * | 2/2012 | Selfin | ..................... | G06F 3/061 |
| | | | | 711/103 |

OTHER PUBLICATIONS

EMC CLARiiON SnapView and MirrorView for Oracle Database 10g Automatic Storage Management, White Paper, EMC Corp., Jun. 2006, pp. 1-20.*

* cited by examiner

*Primary Examiner* — Yaima Rigol
*Assistant Examiner* — Glenn Gossage
(74) *Attorney, Agent, or Firm* — Krishnendu Gupta; Jason A. Reyes (57) ABSTRACT

A data storage system, method and computer program product for managing copy on first write data for snapshot purposes are disclosed. In one embodiment, a determination is made whether new data is a first update of original data in a first section of a data storage device in response to receiving a write instruction to write the new data. The new data is provided to a first location of a cache memory and the original data to a second location of the cache memory. Providing the new data to the first location in the cache memory is not dependent on whether the original data has been copied from the data storage device. Further, the original data can be provided to the second location of the cache memory after new data is provided to first location of the cache memory. Completion of the write instruction is confirmed in response to providing the new data to the first location of the cache memory.

9 Claims, 4 Drawing Sheets

METHOD, DATA STORAGE SYSTEM AND COMPUTER PROGRAM PRODUCT FOR MANAGING COPY ON FIRST WRITE DATA FOR SNAPSHOT PURPOSES

TECHNICAL FIELD

This application relates to managing data storage, and more particularly to managing data storage in a data storage system comprising a data storage device and a cache.

BACKGROUND OF THE INVENTION

A computer system is capable of employing a variety of data protection technologies such as snapshot and mirroring functionality. Typically, a snapshot is not a full copy of a production volume. Rather, a snapshot includes only original portions of the production volume which have changed since the snapshot was taken, i.e., Copy on First Write (CoFW) data. On the other hand, a mirror is a full copy of a production volume, i.e., a byte-by-byte real time copy of the production volume.

Examples of snapshot-related products include Snap-Sure™ and SnapView™ both of which are provided by EMC Corporation of Hopkinton, Mass. An example of a mirroring product is MirrorView™ which is also provided by EMC Corporation of Hopkinton, Mass.

In connection with conventional snapshots, suppose that an original data block of a particular production volume requires updating on a computer system. Along these lines, when the processor of the computer system receives an instruction to modify the original data block of the particular production volume (e.g., a write instruction, a read-modify-write instruction, etc.), the processor reads the original data block of the particular production volume (as CoFW data) from disk into cache memory such that this data can be subsequently copied to snapshot storage. It is only after the read operation is complete that the new data can be written to cache and acknowledged.

Unfortunately, the above-described conventional snapshot approach may be a source of inefficiency and may impact performance of normal file system operations. For example, the latency can be significantly affected by the copying of the CoFW data before the new data can be stored and acknowledged.

SUMMARY OF THE INVENTION

There is disclosed a computer-implemented method for use in managing data storage in a data storage system, wherein the data storage system comprises a data storage device and a cache memory, the method comprising: receiving a write operation to write new data to a first section of the data storage device; determining whether the new data is a first update of the original data in the first section of the data storage device; providing the new data to a first location of the cache memory in response to determining the new data is a first update; providing the original data to a second location of the cache memory in response to determining the new data is a first update; and confirming completion of the write operation in response to providing the new data to the first location of the cache memory.

There is also disclosed a data storage system, comprising: a cache memory; a data storage device which is separate from the cache memory; and a control circuit coupled to the cache memory and the data storage device, the control circuit being constructed and arranged to: receive a write operation to write new data to a first section of the data storage device; determine whether the new data is a first update of the original data in the first section of the data storage device; provide the new data to a first location of the cache memory in response to determining the new data is a first update; provide the original data to a second location of the cache memory in response to determining the new data is a first update; and confirm completion of the write operation in response to providing the new data to the first location of the cache memory.

There is further disclosed a computer program product having a non-transitory computer readable storage medium which stores code for use in managing data storage in a data storage system, wherein the data storage system comprises a data storage device and a cache, the code including instructions to: receive a write operation to write new data to a first section of the data storage device; determine whether the new data is a first update of the original data in the first section of the data storage device; provide the new data to a first location of the cache memory in response to determining the new data is a first update; provide the original data to a second location of the cache memory in response to determining the new data is a first update; and confirm completion of the write operation in response to providing the new data to the first location of the cache memory.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

The invention can be implemented in numerous ways, including as a process, an apparatus, a system, a computer program embodied on a computer readable storage medium, and/or a processor, such as a processor configured to execute instructions stored on and/or provided by a memory coupled to the processor. In this specification, the implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

Figure 1:
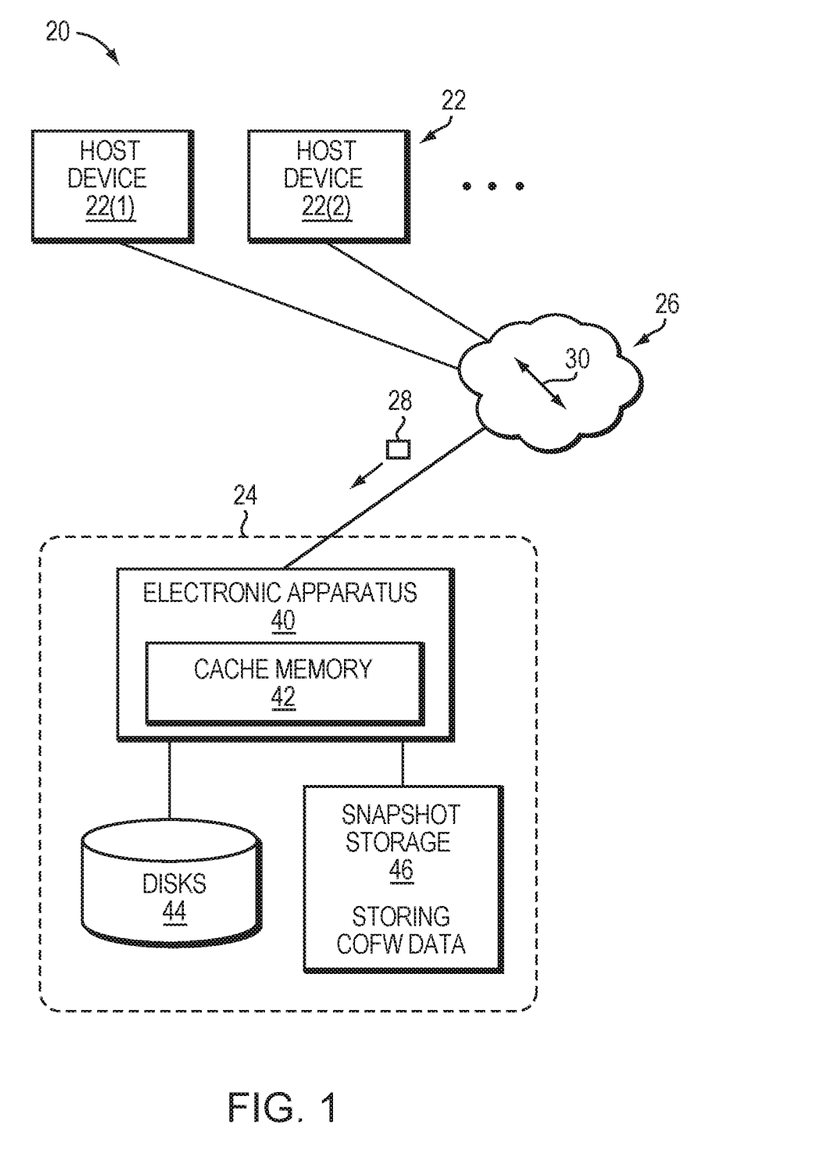
FIG. 1 is a block diagram of a system that may utilize the techniques described herein.

Referring to FIG. 1, there is illustrated a system 20 that may utilize the techniques described herein. The system 20 includes host devices 22(1), 22(2), . . . (collectively, host devices 22), data storage system 24, and communications medium 26.

The host devices 22 are constructed and arranged to store data into and load data from the storage system 24. Along these lines, each host device 22 is capable of providing IO instructions 28 to the storage system 24 (e.g., read IOs and write IOs in the form of SCSI commands, iSCSI commands, etc.).

The storage system 24 is constructed and arranged to process the IO instructions 28 from the host devices 22. Additionally, when host data is written to or modified on the storage system 24, the changes may also be mirrored by a mirror assembly (not shown). As a result, the storage system 24 can provide high availability, provide fault tolerance, load balancing, etc.

The communications medium 26 connects the various components of the system 20 together to enable these components to exchange electronic signals 30 (e.g., see the double arrow 30). At least a portion of the communications medium 26 is illustrated as a cloud to indicate that the communications medium 26 is capable of having a variety of different topologies including backbone, hub-and-spoke, loop, irregular, combinations thereof, and so on. Along these lines, the communications medium 26 may include copper-based data communications devices and cabling, fiber optic devices and cabling, wireless devices, combinations thereof, etc. Furthermore, the communications medium 26 is capable of supporting LAN-based communications, SAN-based communications, or combinations thereof.

The data storage system 24 includes an electronic apparatus 40 having internal cache memory 42 (e.g., a dedicated part of semiconductor-based main memory which forms a cache), disk storage 44 (e.g., an array of magnetic disks dedicated to volume storage) and snapshot storage 46 (e.g., snapshot save area memory which is separate from the cache and volume storage). In this embodiment, the disk storage 44 stores a production file system (e.g., one or more volumes) which is made available to the host devices 22. The snapshot storage 46 stores CoFW data in the event a snapshot must be restored. This CoFW data is original data of the production file system that existed at the time the snapshot was taken, and that is saved in the snapshot storage 46 when the original data of the production file system is updated with new data.

It should be understood that the disk storage 44 and the snapshot storage 46 are shown in FIG. 1 as being external to the electronic apparatus 40 by way of example only. The disks 44 may be internal to the electronic apparatus 40 (e.g., local disks of a storage server) or external to the electronic apparatus 40 (e.g., in a separate data storage array). Similarly, the snapshot storage 46 (e.g., disk memory, semiconductor memory, etc.) may be internal to the electronic apparatus 40 or external to the electronic apparatus 40.

As discussed briefly above, it should be further understood that a mirror system or assembly may be provisioned in a manner similar to that of the data storage system 24 (e.g., for business continuity). The mirror assembly can maintain a mirror file system to mirror the production file system of the data storage system 24. In some arrangements, the data storage system 24 and the mirror assembly can operate in an active-active manner. In other arrangements, the system and the mirror assembly can operate in an active-passive manner.

During operation of the system 20, the data storage system 24 is equipped to take snapshots in response to snapshot commands from a user (e.g., a system administrator). For example, the user may anticipate the possible need to quickly restore the production file system to an earlier point in time and thus direct the system to take a snapshot of the production file system.

When the snapshot is taken, the electronic apparatus 40 of the data storage system 24 creates snapshot metadata to manage snapshot data for a potential restore. Although no data is immediately copied from the production file system in response to the snapshot command, the electronic apparatus 40 of the data storage system 24 is now ready to copy original data of the production file system as needed and before that original data is modified by the host devices 22.

After the snapshot is taken, suppose that the data storage system 24 receives a write instruction 28 to change a particular portion of the production file system. For example, suppose that a host device 22 writes new data to the data storage system 24 to modify a particular data block of the production file system. In response to such a write instruction 28, the data storage system 24 checks the snapshot metadata to determine whether the new data is the first update of the particular data block. If not, the data storage system 24 simply updates the particular data block with the new data. However, if the metadata indicates that the particular data block is the original data that existed at the time the snapshot was taken and is thus CoFW data (i.e., the particular data block has not changed since the snapshot was taken), the data storage system 24 sets up a new location X (not shown) in the cache memory 42 pointing to the disk location L (not shown) of the original CoFW data. The system 24 then initiates a read of the CoFW data from the disk location L in the disks 44 to the new location X in the cache memory 42. Additionally, the data storage system 24 configures a separate location Y (not shown) in the cache memory 42 corresponding to the disk location L to receive the new data in the write operation performed in response to the write instruction 28. The data storage system 24 also configures the separate location Y in cache memory 42 such that the new data cannot be de-staged from the separate location Y in the cache memory 42 to the disk location L. The data storage system 24 subsequently initiates a transfer of the new data from the host 22 to the separate location Y in the cache memory 42 even though the read from the disks 44 to the new location X in the cache memory 42 may not be complete at this time. In contrast to the prior art where the copy operations of the CoFW data need to be complete before the write of the new data to the cache memory can be initiated, the data storage system 24 herein enables the CoFW data and the new data to be provided to their respective locations (X, Y) in the cache memory 42 at substantially the same time. It should be appreciated that in this embodiment the data storage system 24 can acknowledge to the host 22 the write of the new data once the new data is stored in the separate location Y in the cache memory 42. The acknowledgement to the host can be performed even if the read of the CoFW data to the new location X in the cache memory 42 is not complete. However, it should be appreciated from the foregoing that the new data cannot be de-staged to the disks 44 at this time as the cache memory 42 is configured to prevent the de-staging of data from the separate location Y in cache memory. It is not until the CoFW data is in the new location X in the cache memory 42 that the data storage system 24 can remove the prevention of writes from the separate location Y in cache memory 42 and enable the de-staging of data. In other words, the data storage system 24 prevents the overwriting of the original data with the new data prior to the CoFW data being confirmed in the new location X in cache memory 42. Once the CoFW data is confirmed in the new location X, the data storage system 24 can de-stage the new data from the separate location Y in the cache memory 42 to the disk location L in disks 44. The CoFW data can be de-staged from the new location X in cache memory 42 to the snapshot storage 46 at any time after storage in the cache memory 42.

In another embodiment, if the metadata indicates that the particular data block is the original data and the CoFW data is located in the cache memory 42, the data storage system 24 can copy the CoFW data from the cache memory 42 without performing an extra read IO from the production file system on the disks 44 and update the metadata. For example, the circuitry of the electronic apparatus 40 may have previously copied the CoFW data into the cache memory 42 from the production file system on disks 44 in response to an earlier read IO. Alternatively, if the write instruction 28 defines a read-modify-write operation, the circuitry will have recently copied the CoFW data into the cache memory 42 from the production file system as part of the read-modify-write operation. In either situation, there is no additional read IO performed to obtain the CoFW data from the disks 44. Rather, the circuitry of the electronic apparatus 40 simply locates the CoFW data within the cache memory 42 (e.g., utilizing a standard hash algorithm to locate data within the buffer cache due to a cache hit) and copies the located CoFW data from the cache memory 42 to the snapshot storage 46. Accordingly, such operation saves an extra read IO when placing the CoFW data in the snapshot storage 46 for snapshot purposes.

When the CoFW data is safely stored in the snapshot storage 46, the user is able to restore the production file system to the earlier state of the snapshot. In particular, the earlier state is simply the combination of the non-modified original data within the production file system and the CoFW data saved in the snapshot storage 46.

Furthermore, since all changes to the production file system can be further mirrored to a mirror file system stored on the disks of a mirror assembly, a copy of the current state of the production file system can be accessible for high availability. Accordingly, if the host devices 22 lose access to the data storage system 24, the host devices 22 are able to access the mirror file system maintained by the mirror assembly. Further details will now be provided with reference to FIG. 2.

Figure 2:
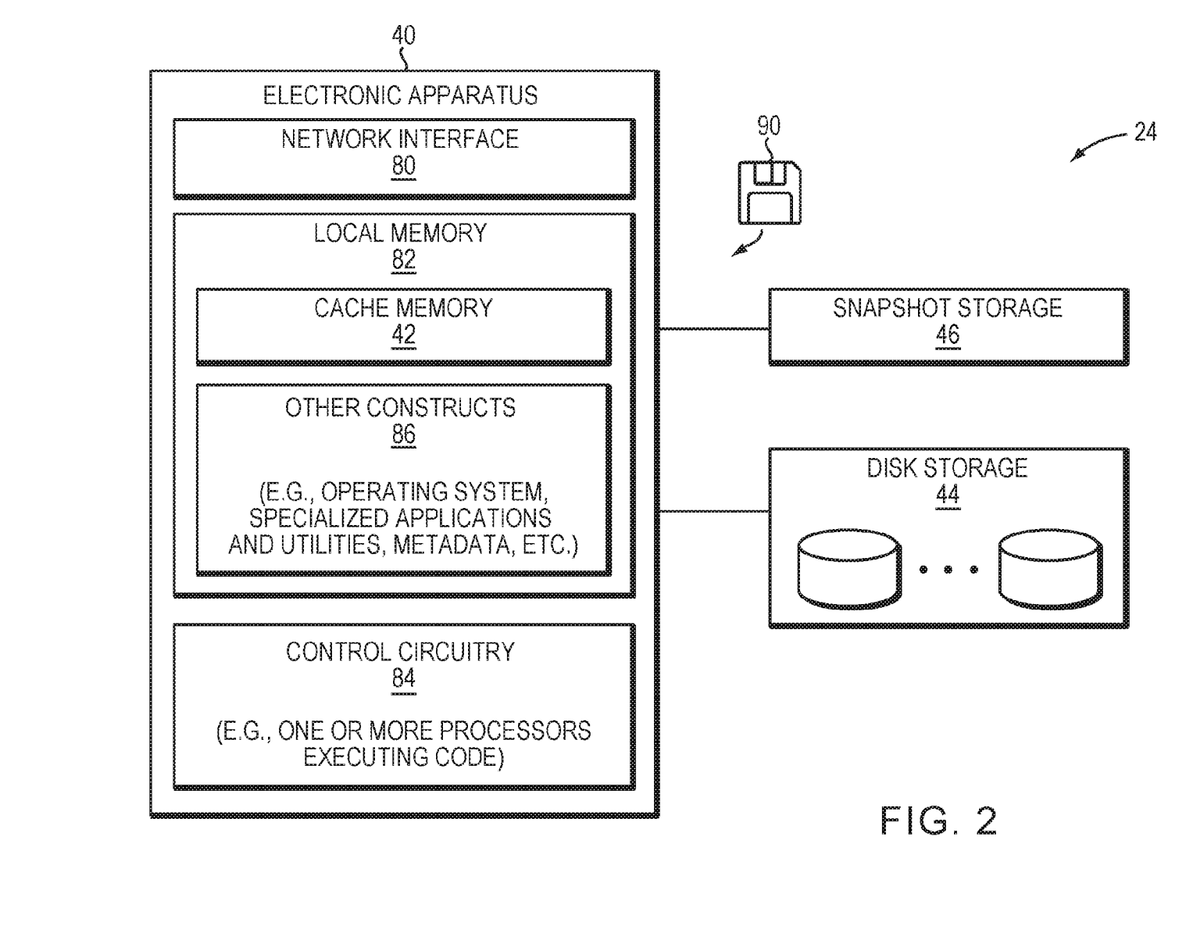
FIG. 2 is a block diagram of particular details of a data storage system of the system of FIG. 1.

Referring to FIG. 2, there are illustrated particular details of the data storage system 24. As shown, the data storage system 24 includes the electronic apparatus 40, the disk storage 44 storing the production file system and the snapshot storage 46 for storing the CoFW data (also see FIG. 1). As shown in FIG. 2, the electronic apparatus 40 includes a network interface 80, local memory 82 and control circuitry 84.

The network interface 80 is constructed and arranged to connect the electronic apparatus 40 to the communications medium 26 (see FIG. 1). Accordingly, the network interface enables the electronic apparatus 40 to communicate with the other components of the system 20.

The local memory 82 can represent both volatile memory (e.g., semiconductor-based memory) and non-volatile memory (e.g., disk memory) of the electronic apparatus 40. As shown, the local memory 82 includes cache memory 42 for caching host data exchanged between the host devices 22, and additional memory 86 for storing other constructs such as an operating system, specialized applications and utilities, snapshot metadata, etc.

The control circuitry 84 is constructed and arranged to perform load and store operations (i.e., process SCSI commands) on behalf of the host devices 22 (FIG. 1). Additionally, the control circuitry 84 is constructed and arranged to efficiently maintain snapshots of the production file system as well as restore the production file system to the previously taken snapshots.

It should be understood that the control circuitry 84 can be implemented in a variety of ways including via one or more processors running specialized software, application specific ICs (ASICs), field programmable gate arrays (FPGAs) and associated programs, discrete components, analog circuits, other hardware circuitry, combinations thereof, and so on. In the context of one or more processors running specialized software, a computer program product 90 is capable of delivering all or portions of the software to the electronic apparatus 40. The computer program product 90 has a non-transitory (or non-volatile) computer readable medium which stores a set of instructions which controls one or more operations of the electronic apparatus 40. Examples of suitable computer readable storage media include tangible articles of manufacture and apparatus which store instructions in a non-volatile manner such as CD-ROM, flash memory, disk memory, tape memory, and the like.

During operation, if the electronic apparatus 40 receives host IO instructions 28 from the host devices 22 (e.g., SCSI read and write commands, also see FIG. 1) to write new data to a portion of the production file system as a first update of that portion since a snapshot of the production file system was taken, the electronic apparatus 40 reads the portion of the production file system from the disk(s) 44 into a new location in the cache memory. Additionally, the new data is written to a separate location in the cache memory and is later de-staged to disks.

It should be understood that legacy equipment can be re-configured with the above-described improvement. In particular, the existing snapshot feature can be modified or retrained. As a result, snap performance improves significantly by reducing latency for acknowledging write operations to the host. Moreover, such improved operation still guarantees data consistency.

Figure 3:
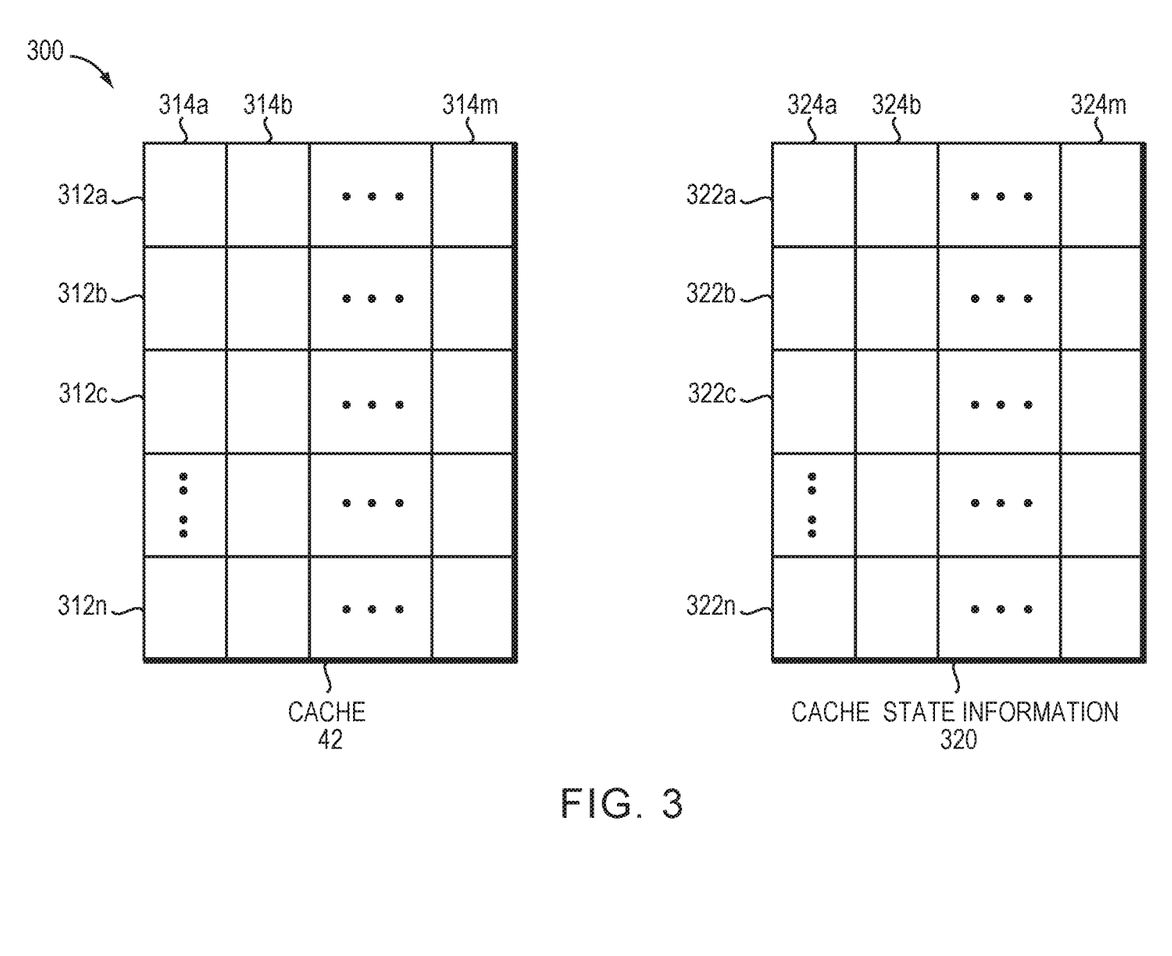
FIG. 3 illustrates a cache and associated cache state information that can be stored in the data storage system of FIG. 2.

Referring to FIG. 3, there is illustrated a cache and associated cache state information that may be used in an embodiment in accordance with techniques herein. The example 300 includes cache 42 and associated cache state information 320. The cache 42 is an example illustrating cache pages 312a-312n as may be included in each of the storage processors (SPs) as described in connection with other figures herein. The cache 42 may include any number of "n" cache pages 312a-312n where each such cache page may be further partitioned into one or more "m" subpages denoted 314a-314m. In one embodiment, each subpage may correspond to a sector of a storage device and may be able to cache data for the corresponding sector therein. More generally, each subpage of a cache page may correspond to any portion of a storage device having a subrange of addresses of the storage device. For example, in one embodiment the storage device may be a LUN having a total capacity with an LBA (logical block address) range. Each sector or portion of the LUN as stored in a subpage of cache may have an associated subrange of LBA addresses for the LUN representing the portion of the LUN having data stored in the subpage of cache. Cache state information 320 may be stored for each cache page. Furthermore, an embodiment may store cache state information at the subpage level such as for each of the "m" subpages of a single cache page. The cache state information 320 illustrates maintaining cache state information 322a-322n, respectively, for each cache page 312a-312n. Additionally, each row of cache state information 322a-322n maintains cache state information 324a-324m for each subpage 314a-314m.

It should be appreciated that the cache state information 320 for each subpage of cache may include a pair of status bits indicating that the cache subpage includes cached data in one of four states—VALID, DIRTY, INVALID and PREPARED—with respect to a portion of a physical device denoted as having its data cached in the subpage:

VALID—indicating that the cache and the physical storage device contain the same current copy of the data. The subpage having the valid state may also be characterized as having valid cached data for the portion of the storage device.

DIRTY—indicating that the cache has the more recent or current copy of the data rather than the physical storage device. This may be the case where such cached data of the subpage is write pending and has yet to be destaged to the physical storage device. The subpage having the dirty state may also be characterized as having dirty cached data for the portion of the storage device.

INVALID—indicating that the cached copy of data is invalid or out of date and not the most recent or current copy of the data. The subpage having the valid state may also be characterized as having invalid cached data for the portion of the storage device.

PREPARED—indicating a transient state related to a transaction of one or more write operations described and used in connection with techniques herein below. The prepared state may be set to denote that the cached subpage includes cached data needed and used in connection with performing a transactional commit operation as described herein to commit data of a transaction to the cache of a single storage processor (SP) and subsequently to the mirrored cache of the second storage processor (SP).

An embodiment may also maintain and utilize other cache state information 320 for each subpage and/or cache page than as described herein. The cache state information 320 may be stored physically in storage locations which may or may not be contiguous with respect to the cached data of cache 42. For example, cache state information for a sector may or may not be stored contiguously with respect to the cached data for the sector. Furthermore, it may be desirable to store portions of the cache state information 320 collectively in the aggregate in the same physical storage area. For example, an embodiment may store the status bits for each cache page in the aggregate in a single storage area in order to facilitate access and performing processing on sets of multiple status bits across multiple cache pages. An embodiment may use any one of a variety of different suitable data structures and techniques to implement the cache and management thereof. Furthermore, an embodiment may utilize any suitable technique to represent the mapping or association of one or more cache subpages or pages to a particular portion of a storage device thereby indicating that the cache subpages or pages are used to cache data for the same storage device locations.

In accordance with techniques herein, it should be appreciated that a page 312 or subpage 314 may correspond to a sector of a disk 44 and can cache data for the corresponding sector therein. As a result, the write operation performed in response to the write instruction 28 can write the new data from the host 22 to the page 312 or subpage 314 in the cache memory 42. However, the data storage system 24 can allocate another page 312 or subpage 314 in cache memory 42 for the CoFW data. For example, the system can allocate a page 312 or subpage 314 containing 'INVALID' data to receive the COFW before the CoFW data is de-staged to the snapshot storage 46.

Figure 4:
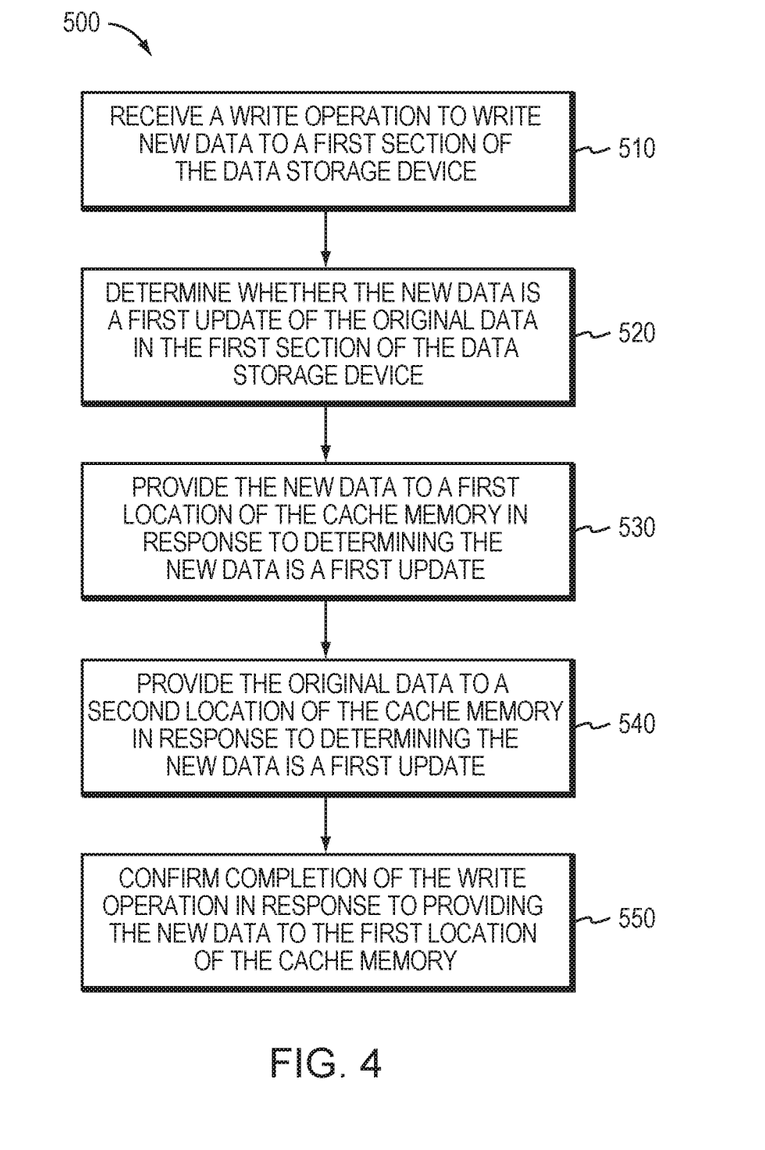
FIG. 4 is a flowchart of a procedure that can be used for managing data storage in the data storage system of FIG. 2.

Referring to FIG. 4, there is illustrated a flowchart of a procedure 500 that may be performed by the data storage system 24. The exemplary procedure 500 can be used for managing data storage in a data storage system comprising a data storage device (e.g., disks 44) and a cache memory 42. It should be appreciated that the data storage device is separate from the cache memory. In the flow diagram, the operations are summarized in individual blocks. The operations may be performed in hardware, or as processor-executable instructions that may be executed by a processor. Furthermore, the procedure 500 may, but need not necessarily, be implemented using the data storage system of FIG. 2.

At step 510, a write instruction is received to write new data to a first section of the data storage device. For example, the write instruction 28 can be received from a host 22 to write new data to a location in the disks 44. The write operation performed in response to the write instruction 28 can write new data to overwrite the original data stored in disks 44.

At step 520, it is determined whether the new data is a first update of the original data in the first section of the data storage device. For example, a host device 22 may write new data to the data storage system 24 in response to a write instruction 28, to modify a particular data block of the production file system. In response to the write instruction 28, the data storage system 24 will check the snapshot metadata to determine whether the new data is the first update of the particular data block.

At step 530, the new data is provided to a first location of the cache memory in response to determining the new data is a first update. For example, if the data storage system 24 determines that the data stored in disks 44 is CoFW data, the new data in the write operation 28 will be written to the first location in the cache memory 42.

At step 540, the original data is provided to a second location of the cache memory in response to determining the new data is a first update. For example, if the data storage system 24 determines that the data stored in disks 44 is CoFW data, the CoFW data will be read to the second location in the cache memory 42.

It should be appreciated from the foregoing descriptions with respect to FIGS. 1 and 2 that the step 540 may in some embodiments be performed prior to step 530. However, it should also be appreciated that whatever the embodiment both the new data and CoFW data are provided to their respective locations at substantially the same time.

At step 550, the completion of the write operation is confirmed in response to providing the new data to the first location of the cache memory 42. For example, the write operation 28 can be acknowledged once the new data is stored in the cache memory 42 even if the CoFW data is still being read into the second location in the cache memory 42. Once the CoFW data is stored in the cache memory, the new data can be destaged to disk and the CoFW data can be de-staged to snapshot storage 46 at any time thereafter.

While various embodiments of the present disclosure have been particularly shown and described, it will be understood by those skilled in the art that various changes in form and details may be made therein without departing from the spirit and scope of the present disclosure as defined by the appended claims.

What is claimed is:

1. A computer-implemented method for use in managing data storage in a data storage system, wherein the data storage system comprises a data storage device and a cache memory, the method comprising:
   receiving a write instruction to perform a write operation to write new data to a first section of the data storage device;
   determining whether the new data is a first update of original data stored in the first section of the data storage device;
   in response to determining that the new data is a first update of the original data, storing the new data in a first location of the cache memory, and storing the original data in a second location of the cache memory, wherein the original data may be stored in the second location of the cache memory after the new data is stored in the first location of the cache memory;
   in response to storing the new data in the first location of the cache memory, confirming completion of the write operation, wherein the data storage system is configured to confirm completion of the write operation irrespective of whether the original data is stored in the second location of the cache memory;
   in response to storing the original data in the second location of the cache memory, enabling the data storage system to de-stage the new data from the first location of the cache memory to first section of the data storage device, wherein the data storage system is configured to prevent overwriting of the original data in the data storage device with the new data until the original data is stored in the second location in the cache memory and the data storage system is enabled to de-stage the new data from the first location of the cache memory to the first section of the data storage device;
   de-staging the new data in the first location of the cache memory to the first section of the data storage device; and
   de-staging the original data in the second location of the cache memory to a snapshot storage area in the data storage system.

2. The method as claimed in claim 1, wherein the new data is stored in the first location of the cache memory before completion of storing the original data in the second location of the cache memory.

3. The method as claimed in claim 1, wherein the new data and the original data are stored in their respective locations in the cache memory substantially simultaneously.

4. A data storage system, comprising:
   a cache memory;
   a data storage device; and
   a control circuit coupled to the cache memory and the data storage device, the control circuit being constructed and arranged to:
   receive a write instruction to perform a write operation to write new data to a first section of the data storage device;
   determine whether the new data is a first update of original data stored in the first section of the data storage device;
   in response to determining that the new data is a first update of the original data, store the new data in a first location of the cache memory, and store the original data in a second location of the cache memory, wherein the original data may be stored in the second location of the cache memory after the new data is stored in the first location of the cache memory;
   in response to storing the new data in the first location of the cache memory, confirm completion of the write operation, wherein the data storage system is configured to confirm completion of the write operation irrespective of whether the original data is stored in the second location of the cache memory;
   in response to storing the original data in the second location of the cache memory, enable the data storage system to de-stage the new data from the first location of the cache memory to first section of the data storage device, wherein the data storage system is configured to prevent overwriting of the original data in the data storage device with the new data until the original data is stored in the second location in the cache memory and the data storage system is enabled to de-stage the new data from the first location of the cache memory to the first section of the data storage device;
   de-stage the new data in the first location of the cache memory to the first section of the data storage device; and
   de-stage the original data in the second location of the cache memory to a snapshot storage area in the data storage system.

5. The data storage system as claimed in claim 4, wherein the new data is stored in the first location of the cache memory before completion of storing the original data in the second location of the cache memory.

6. The data storage system as claimed in claim 4, wherein the new data and the original data are stored in their respective locations in the cache memory substantially simultaneously.

7. A computer program product having a non-transitory computer readable storage medium which stores code for use in managing data storage in a data storage system, wherein the data storage system comprises a data storage device and a cache memory, the code including instructions to:
   receive a write instruction to perform a write operation to write new data to a first section of the data storage device;
   determine whether the new data is a first update of original data stored in the first section of the data storage device;
   in response to determining that the new data is a first update of the original data, store the new data in a first location of the cache memory, and store the original data in a second location of the cache memory, wherein the original data may be stored in the second location of the cache memory after the new data is stored in the first location of the cache memory;
   in response to storing the new data in the first location of the cache memory, confirm completion of the write operation, wherein the data storage system is configured to confirm completion of the write operation irrespective of whether the original data is stored in the second location of the cache memory;
   in response to storing the original data in the second location of the cache memory, enable the data storage system to de-stage the new data from the first location of the cache memory to first section of the data storage device, wherein the data storage system is configured to prevent overwriting of the original data in the data storage device with the new data until the original data is stored in the second location in the cache memory and the data storage system is enabled to de-stage the new data from the first location of the cache memory to the first section of the data storage device;

de-stage the new data in the first location of the cache memory to the first section of the data storage device; and de-stage the original data in the second location of the cache memory to a snapshot storage area in the data storage system.

8. The computer program product as claimed in claim 7, wherein the new data is stored in the first location of the cache memory before completion of storing the original data in the second location of the cache memory.

9. The computer program product as claimed in claim 7, wherein the new data and the original data are stored in their respective locations in the cache memory substantially simultaneously.

* * * * *